(No Model.) 2 Sheets—Sheet 1.
J. A. SMITH.
CORN CULTIVATOR.
No. 552,930. Patented Jan. 14, 1896.
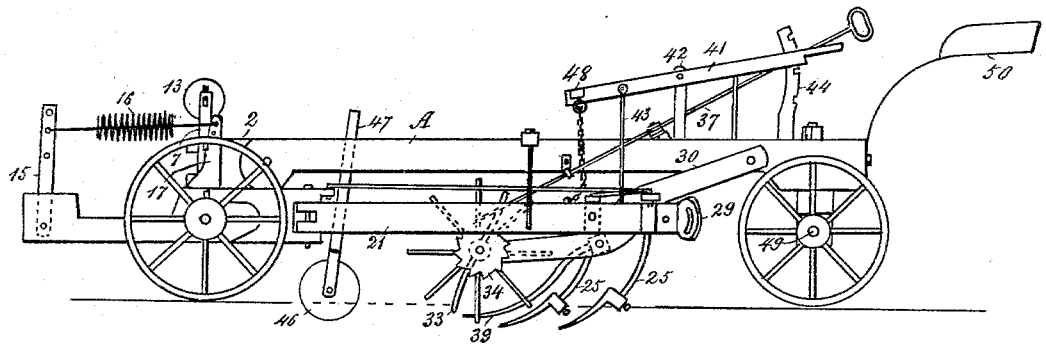
Fig. I.
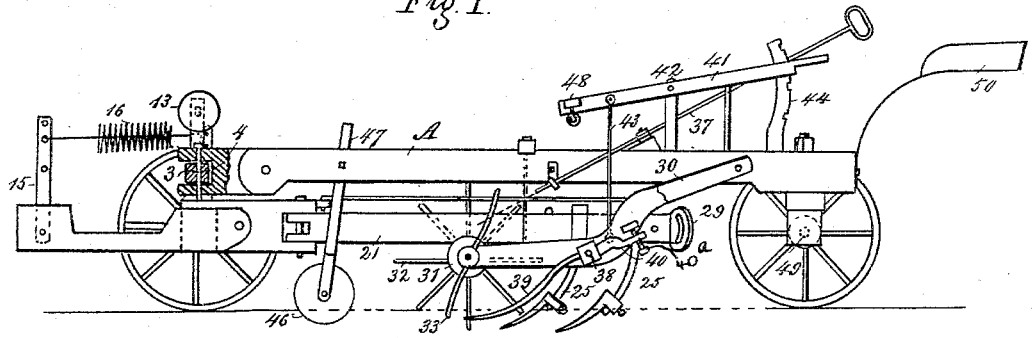
Fig. II.
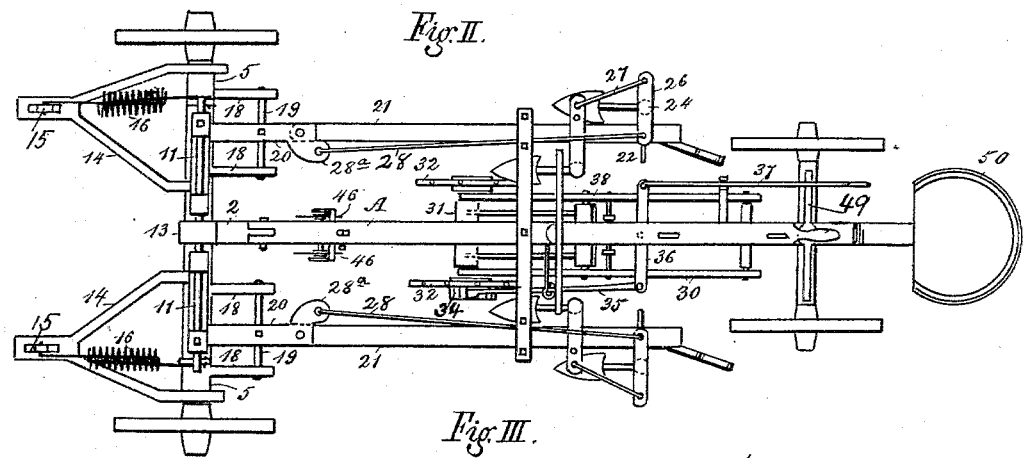
Fig. III.
Witnesses,
R. S. Millar
L. M. Adams
Inventor
Jacob A. Smith
By J. H. Bailey Atty.

(No Model.)
J. A. SMITH.
CORN CULTIVATOR.
No. 552,930.   Patented Jan. 14, 1896.
2 Sheets—Sheet 2.
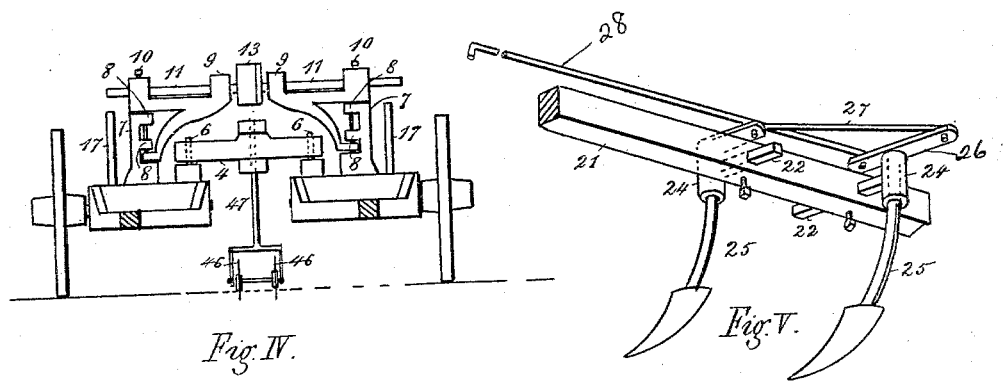
Fig. IV.   Fig. V.
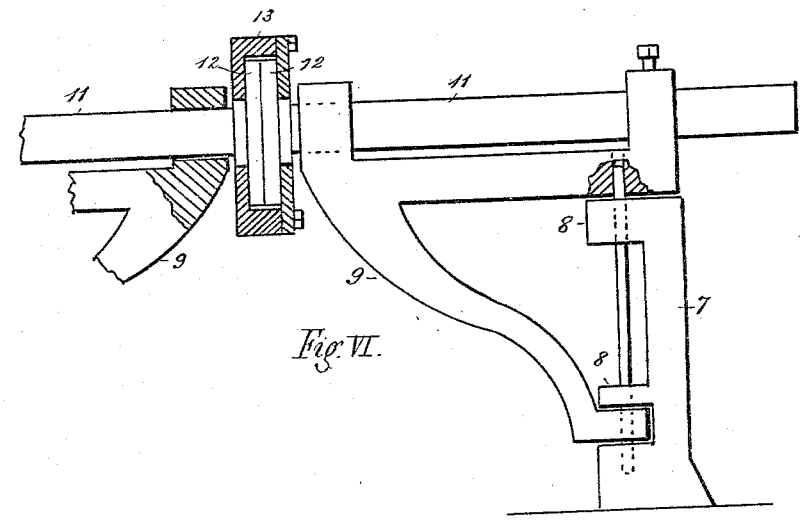
Fig. VI.
Witnesses
R. S. Millar
L. M. Adams
Inventor
Jacob A. Smith
By O. J. Bailey Atty

UNITED STATES PATENT OFFICE.

JACOB A. SMITH, OF WEISBURG, INDIANA.

CORN-CULTIVATOR.

SPECIFICATION forming part of Letters Patent No. 552,930, dated January 14, 1896.

Application filed February 18, 1895. Serial No. 538,837. (No model.)

*To all whom it may concern:*

Be it known that I, JACOB A. SMITH, a citizen of the United States, residing at Weisburg, in the county of Dearborn and State of Indiana, have invented a new and useful Improvement in Corn-Cultivators, which improvement is fully set forth in the following specification and accompanying drawings, in which—

Figure I is a side elevation of my improved corn-cultivator; Fig. II, a central longitudinal elevation, partly in section; Fig. III, a top or plan view; Fig. IV, a transverse section; Fig. V, a detail view of one of the plow-beams, and Fig. VI a detail of the swivel connection of the two parts of the main axle and one of the hinged-bracket standards.

The object of my invention is to provide an improved device for tilling check-rowed corn and is designed to perform the work of a thorough cultivator, and at the same time relieving the plants from any surplus of soil or other matter which may have been thrown upon them with the effect of choking them in many instances or at least impeding their growth.

The construction of the machine will be understood by referring to the accompanying drawings, in which—

A represents a main central beam having in front a jointed section 2, bifurcated and pivotally connected by a king-bolt 3 to a short transverse beam 4, the extremities of which connect the inner ends of the short axle-sections 5 by the pivoted studs 6, as shown in Fig. IV. Each axle-section is also provided with a rigid standard 7 having lugs 8. A bracket 9 is pivotally connected to each standard by a pin 10. A bar 11 passes through the top openings of each bracket, the inner abutting extremities of which are provided with disks 12, which are inclosed in a cylindrical casing 13. (Clearly shown in Fig. VI.) The purpose of this arrangement and that of the hinged brackets will presently appear. Each axle-section is provided with a draft-yoke 14 whose forward end is vertically mortised to receive a pivoted arm 15, to which the draft is adjustably applied. A spring 16 extends from the upper portion of this arm to a post 17, rigidly attached to each axle-section. Projecting rearwardly from each axle-section is a pair of yoke-arms 18 connected by bars 19, to which are adjustably secured stems 20, pivotally attached to the plow-beams 21. Each of said beams has an outwardly-projecting stem 22, the extremities of these being in the form of vertical sleeves 24, forming bearings for the plow-shanks 25. The upper extremities of the shanks are provided with arms 26 connected by a bar 27 to secure unity of movement. To one extremity of the rearward shovel-arm is attached a bar 28, whose forward end is pivotally attached to a lug 28$^a$. (See Fig. V.) This connection causes the shovels to be maintained face forward during the oscillations or lateral swing of the plow-beam. To the rear extremity of each beam is attached an oblique side plate 29 designed for the attachment of adjustable handles when the implement is used as a walking-cultivator.

The rear end of a yoke-frame 30 is pivotally attached to the main beam A, and within its front extremities is journaled a drum 31, to the axial extremities of which are attached star-wheels 32 designed to impart positive motion to the drum. Two sets of fingers 33 extend transversely through the drum and are designed to enter and rake the surface of the soil adjacent to the corn-plants. In order to insure the proper relation of the arms to the plants a ratchet-wheel 34 is attached to one of the star-wheels and is operated by a rod 35, which passes through a suitable guide and connects with an oscillating arm 36 pivoted on the main beam. The opposite extremity of the arm is connected to a handle-rod 37 having a looped end within convenient reach of the driver. This arrangement enables the drum to be properly adjusted when at the beginning of a row of corn.

A rock-shaft 38 is also journaled in the yoke-frame having a pair of curved fingers 39, which glide under the surface of the earth on each side and close to the row, and release the blades and plants which may have been previously covered by the soil. The said rock-shaft is provided with a rearwardly-projecting stem 40 having an adjusting-screw 40$^a$ by which the inclination of the curved fingers may be governed. The said yoke-frame with all its adjuncts can be lifted bodily by a lever 41 pivoted on a standard 42 attached to the main beam. The connection with the yoke-frame is made by the link-bars 43. A segmental standard 44 having a series of notches enables the lever to be held at various inclinations. Two sharp-edged disks 46 are journaled in a yoke 47 upheld by a vertical arm which is adjustably attached near the fore end of the central main beam. A transverse bar 48 having depending chains at its extremities, which connect with the respective plow-beams, enables the latter as well as the yoke-frame mechanism to be hoisted when the machine is turning or *en route* on the highway. The rear axle 49 is short and its vertical stem is provided with a transverse arm whose extremities are engaged by the feet of the driver, who can thus guide the course of the machine with ease. If the driver prefers to walk, the seat 50 can be removed and a simple rudder can be substituted for the said transverse arm.

The operation of the machine will now be described. As it advances, the disks 46, which run astride the row of plants, sever the stalks or other rubbish which lies in their path. The star-wheels engage the soil and cause the drum to revolve. The oppositely-disposed fingers 33 are adjusted to enter the ground in front of the plants, stirring the soil and raking away clods or tufts of grass, the curved fingers gliding under the surface and lifting the blades of the plants which may have been covered by previously-deposited earth or rubbish, while the closely-following plows serve to break up and loosen the soil between the plant-rows.

When either section of the implement is drawn in advance of the other, the pivotal connections shown in Fig. IV are subjected to a torsional strain forcing the normally vertical brackets out of a true plane, and the faces of the disks 12, slipping one upon the other, operate as a swivel and restore the alignment of the axle-sections.

If it be desired to convert the implement into a walking-cultivator, it is only necessary to uncouple the fore end of the central beam, which with all its adjuncts may be easily removed. Handles being then attached to the rear ends of the plow-beams the change is complete.

The plow-shanks may be hinged if preferred and kept normally in position by a "breaking-pin." If the plow should meet an obstruction offering more than ordinary resistance, the pin will give way and prevent damage which might otherwise ensue.

What I claim as new is—

1. In a corn cultivator the central main beam having a front section hinged thereto, the transverse beam 4 pivotally connected to said front section and to the inner ends of the front axle sections, the standards rigidly fixed in said axle sections, the brackets 9 pivotally attached to the standards, the bars 11 passing through the tops of the brackets, the disks 12 attached to the inner extremities of the bars, vertical arms 15 having their lower ends pivotally attached to the front ends of the draft yokes 14, and the springs attached to the upper ends of the arms and extending rearwardly therefrom, substantially as herein specified.

2. In a corn cultivator the combination with the sections of the divided front axle of the yokes 18, the plow beams 21 having lateral outwardly projecting stems 22 forming bearings for the plow shanks 25 having arms 26, the bar 27 connecting said arms, the bars 28 extending forwardly from the rear shovel arms and attached to lugs $28^a$ substantially as and for the purposes specified.

3. The combination with the central main beam of the yoke-frame 30, the drum journaled in the front end of the yoke-frame, star wheels attached to the extremities of the drum, fingers 33, extending transversely through the drum, the ratchet-wheel 34, the rearwardly extending pawl 35, the transverse pivoted arm 36, and the operating rod 37, substantially as and for the purposes specified.

4. The combination with the yoke frame 30 of the transverse rock shaft 38, the curved fingers attached thereto and means as described for adjusting the inclination of the curved fingers substantially as specified.

In testimony that I claim the foregoing I have hereunto set my hand, this 28th day of January, 1895, in the presence of witnesses.

JACOB A. SMITH.

Witnesses:
E. T. STOHLMAN,
J. L. FREELAND.